(12) United States Patent
Montevirgen et al.

(10) Patent No.: US 9,129,659 B2
(45) Date of Patent: Sep. 8, 2015

(54) BUCKLING SHOCK MOUNTING

(75) Inventors: Anthony S. Montevirgen, San Francisco, CA (US); Stephen B. Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 382 days.

(21) Appl. No.: 13/281,123

(22) Filed: Oct. 25, 2011

(65) Prior Publication Data

US 2013/0100591 A1     Apr. 25, 2013

(51) Int. Cl.
  *G11B 33/08*  (2006.01)
  *H04M 1/18*  (2006.01)
  *G06F 1/16*  (2006.01)
  *F16F 3/087*  (2006.01)
  *H04N 5/225*  (2006.01)

(52) U.S. Cl.
  CPC .............. *G11B 33/08* (2013.01); *F16F 3/0876* (2013.01); *G06F 1/1656* (2013.01); *H04M 1/185* (2013.01); *H04N 5/2251* (2013.01); *Y10T 29/49002* (2015.01)

(58) Field of Classification Search
  CPC ........ G06F 1/1658; G06F 1/187; G11B 33/08
  See application file for complete search history.

(56) References Cited

U.S. PATENT DOCUMENTS

| | | | |
|---|---|---|---|
| 3,606,296 A | 9/1971 | Chassagne | |
| 4,278,726 A | 7/1981 | Wieme | |
| 4,849,580 A | 7/1989 | Reuter | |
| 5,182,158 A * | 1/1993 | Schaeffer | 428/178 |
| 5,349,893 A * | 9/1994 | Dunn | 89/36.05 |
| 5,368,914 A | 11/1994 | Barrett | |
| 5,426,562 A | 6/1995 | Morehouse et al. | |
| 5,587,854 A | 12/1996 | Sato et al. | |
| 5,606,341 A * | 2/1997 | Aguilera | 345/87 |
| 5,659,376 A * | 8/1997 | Uehara et al. | 349/58 |
| 5,666,261 A * | 9/1997 | Aguilera | 361/679.09 |
| 5,783,297 A | 7/1998 | Wise et al. | |
| 5,936,600 A * | 8/1999 | Ohashi et al. | 345/87 |
| 5,965,249 A | 10/1999 | Sutton et al. | |
| 5,982,617 A * | 11/1999 | Haley et al. | 361/679.26 |
| 6,085,878 A * | 7/2000 | Araki et al. | 188/377 |
| 6,154,360 A | 11/2000 | Kaczeus, Sr. et al. | |
| 6,251,493 B1 | 6/2001 | Johnson et al. | |
| 6,262,888 B1 | 7/2001 | Siedow et al. | |
| 6,288,489 B1 * | 9/2001 | Isohata et al. | 313/582 |
| 6,324,054 B1 | 11/2001 | Chee et al. | |
| 6,373,702 B2 * | 4/2002 | Oishi et al. | 361/704 |
| 6,524,692 B1 * | 2/2003 | Rosen | 428/298.4 |
| 6,596,976 B2 | 7/2003 | Lin et al. | |
| 6,603,620 B1 | 8/2003 | Berding | |
| 6,627,818 B2 | 9/2003 | Kamel et al. | |

(Continued)

FOREIGN PATENT DOCUMENTS

| | | |
|---|---|---|
| CN | 202444711 | 9/2012 |
| CN | 203119975 | 8/2013 |

(Continued)

*Primary Examiner* — Adrian S Wilson
(74) *Attorney, Agent, or Firm* — Brownstein Hyatt Farber Schreck, LLP

(57) ABSTRACT

A buckling shock mounting and method related thereto are discussed herein. In one embodiment, the buckling shock mounting may take the form of a plurality of panels oriented uprightly within a plane to form at least one geometric shape. The plurality of panels are made of a uniform material and each of the panels is configured to buckle when a threshold amount of force is applied perpendicularly to the plane.

20 Claims, 10 Drawing Sheets

(56) References Cited

U.S. PATENT DOCUMENTS

| | | |
|---|---|---|
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,701,529 B1 | 3/2004 | Rhoades et al. |
| 6,744,186 B2* | 6/2004 | Oishi et al. ............ 313/46 |
| 6,809,916 B2* | 10/2004 | Nakata et al. ............ 361/115 |
| 6,859,357 B2* | 2/2005 | Morimoto et al. ....... 361/679.55 |
| 6,871,888 B2* | 3/2005 | Yamagiwa ............ 293/102 |
| 6,924,996 B2 | 8/2005 | Sugawara |
| 6,968,954 B2* | 11/2005 | Hsieh ............ 206/587 |
| 7,009,835 B2 | 3/2006 | Desai et al. |
| 7,059,182 B1 | 6/2006 | Ragner |
| 7,094,094 B2 | 8/2006 | Zahnen et al. |
| 7,113,351 B2 | 9/2006 | Hovanky |
| 7,133,281 B2* | 11/2006 | Bae ............ 361/679.21 |
| 7,167,360 B2 | 1/2007 | Inoue et al. |
| 7,259,357 B2 | 8/2007 | Walker |
| 7,260,885 B2 | 8/2007 | Albrecht et al. |
| 7,369,345 B1 | 5/2008 | Li et al. |
| 7,373,863 B2 | 5/2008 | O'Banion et al. |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,532,478 B2* | 5/2009 | Jeong ............ 361/715 |
| 7,554,798 B2* | 6/2009 | Tanokuchi et al. ....... 361/679.21 |
| 7,568,942 B1 | 8/2009 | Lannon et al. |
| 7,612,994 B2 | 11/2009 | Ulrich et al. |
| 7,619,891 B2* | 11/2009 | Woo et al. ............ 361/707 |
| 7,643,243 B2 | 1/2010 | Lee et al. |
| 7,652,892 B2 | 1/2010 | Shiu et al. |
| 7,660,107 B2 | 2/2010 | Leung |
| 7,677,538 B2* | 3/2010 | Darnell et al. ............ 267/152 |
| 7,684,183 B2* | 3/2010 | Mori et al. ............ 361/679.36 |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 8,093,811 B2* | 1/2012 | Tanokuchi et al. ........... 313/582 |
| 8,106,789 B2 | 1/2012 | Yang et al. |
| 8,144,453 B2* | 3/2012 | Brown et al. ............ 361/679.21 |
| 8,189,280 B2 | 5/2012 | Ollila et al. |
| 8,190,015 B2 | 5/2012 | Li et al. |
| 8,240,777 B2 | 8/2012 | Heren et al. |
| 8,248,777 B2* | 8/2012 | Prest ............ 361/679.36 |
| 8,289,689 B2* | 10/2012 | Chen et al. ............ 361/679.3 |
| 8,289,715 B2* | 10/2012 | Takahara ............ 361/721 |
| 8,297,601 B2 | 10/2012 | Vito et al. |
| 8,305,744 B2 | 11/2012 | Shedletsky et al. |
| 8,330,305 B2 | 12/2012 | Hart et al. |
| 8,352,077 B2 | 1/2013 | Goswami et al. |
| 8,411,432 B1* | 4/2013 | Zimlin et al. ............ 361/679.55 |
| 8,446,475 B2 | 5/2013 | Topliss et al. |
| 8,467,133 B2 | 6/2013 | Miller |
| 8,564,424 B2 | 10/2013 | Evarts et al. |
| 2003/0168790 A1 | 9/2003 | Larson |
| 2005/0017396 A1* | 1/2005 | Pearce et al. ............ 264/148 |
| 2006/0109581 A1 | 5/2006 | Lee et al. |
| 2008/0024972 A1 | 1/2008 | Yamaguchi |
| 2008/0091309 A1 | 4/2008 | Walker |
| 2008/0192124 A1 | 8/2008 | Nagasaki |
| 2009/0273480 A1 | 11/2009 | Mittleman et al. |
| 2010/0149073 A1 | 6/2010 | Chaum et al. |
| 2010/0162835 A1 | 7/2010 | Lee et al. |
| 2010/0164152 A1 | 7/2010 | Li |
| 2010/0183847 A1* | 7/2010 | Pearce et al. ............ 428/158 |
| 2010/0272969 A1* | 10/2010 | Taylor ............ 428/196 |
| 2011/0228460 A1* | 9/2011 | Kim et al. ............ 361/679.01 |
| 2011/0257765 A1 | 10/2011 | Evans et al. |
| 2011/0279961 A1* | 11/2011 | Shedletsky et al. ....... 361/679.21 |
| 2011/0310500 A1 | 12/2011 | Osaka et al. |
| 2012/0212484 A1 | 8/2012 | Haddick et al. |
| 2012/0212499 A1 | 8/2012 | Haddick et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0100591 A1 | 4/2013 | Montevirgen et al. |
| 2013/0127980 A1 | 5/2013 | Haddick et al. |
| 2013/0257582 A1 | 10/2013 | Rothkopf et al. |
| 2013/0278631 A1 | 10/2013 | Border et al. |
| 2013/0285490 A1 | 10/2013 | Rothkopf et al. |
| 2014/0066122 A1 | 3/2014 | Shukla et al. |

FOREIGN PATENT DOCUMENTS

| | | |
|---|---|---|
| GB | 1133198 | 11/1968 |
| JP | 2008067160 | 3/2008 |
| JP | 2009104407 | 5/2009 |
| JP | 2011099758 | 5/2011 |
| WO | WO2010/135421 | 11/2010 |

\* cited by examiner

US 9,129,659 B2

BUCKLING SHOCK MOUNTING

TECHNICAL FIELD

The present disclosure is generally related to apparatus and method for protecting components from mechanical shock and, more particularly, to a buckling shock mounting that provides rigid support to components and is configured to buckle under threshold amount of force.

BACKGROUND

Electronic devices commonly include components that may be negatively impacted by mechanical shock. In some cases, mechanical shock may render a component inoperable and, in some cases, prevent the device from properly operating. As many of today's electronic devices are handheld or portable, the likelihood that a particular device gets dropped at some point during its useful life is relatively high. As such, shock absorbers have been implemented to help decrease the impact of mechanical shock experienced by certain components. Conventional shock absorbers, however, may be generally incapable of providing a desired amount of cushion against shock. Further, they may not provide adequate support to hold the component in a desired position within a housing of the devices.

SUMMARY

Embodiments related to buckling shock mountings for components within an electronic device are discussed. In one embodiment, the buckling shock mounting may take the form of a plurality of panels oriented uprightly within a plane to form at least one geometric shape. The plurality of panels are made of a uniform material and each of the panels is configured to buckle when a threshold amount of force is applied perpendicularly to the plane.

Another embodiment may take the form of an electronic device having a housing and a shock sensitive component mounted within the housing. A buckling shock mounting made of a uniform material supports the component within the housing. The buckling shock mounting includes a plurality of geometric cells having sidewalls configured to buckle upon application of a threshold amount of force.

Yet another embodiment may take the form of a method of manufacturing an electronic device having buckling shock mounting. The method includes creating a housing and positioning a component within the housing. Additionally, the method includes coupling a buckling shock mounting to the component on a side of the component opposite of the housing. The buckling shock mounting has a plurality of panels arranged within a plane to form a geometric shape and is rigid to support the shock sensitive component. The plurality of panels are configured to buckle when a threshold amount of force is applied to the panels.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments may take the form of a shock absorber configured to buckle when a threshold amount of force is applied. Up to the buckling point, the shock absorber is rigid to support a shock sensitive component within a device housing. In particular, the shock absorber may maintain form, holding the component in place, until after the threshold amount of force is applied. Once the threshold has been surpassed, the shock absorber buckles to absorb the force.

Figure 1:
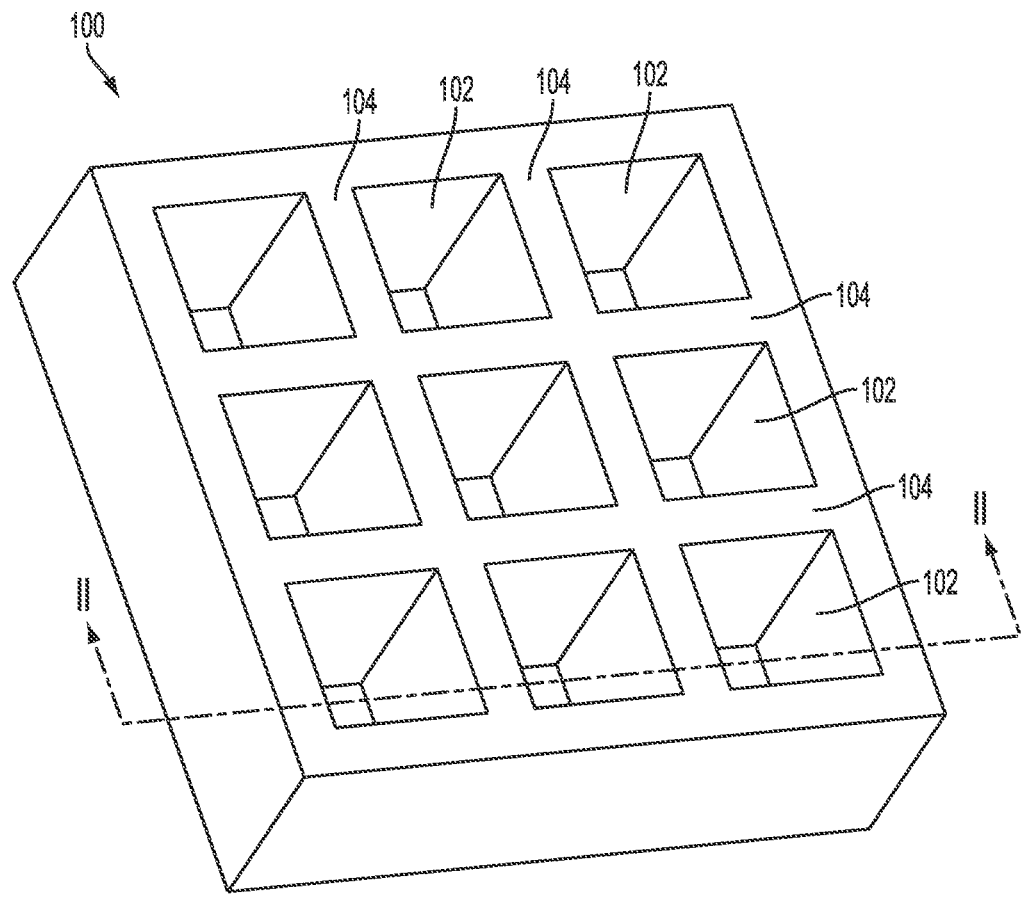
FIG. 1 illustrate a buckling shock absorber in accordance with an example embodiment.

Turning to the drawings and referring initially to FIG. 1, an example buckling shock mounting 100 is illustrated. As used herein, the term "buckling shock mounting" refers to a shock absorbing member that is configured to provide rigid support before buckling to absorb a force that exceeds a threshold. As such, the terms "shock absorber," "buckling shock absorber," and the like may be used interchangably herein with "buckling shock mounting."

Generally, the shock absorber 100 may be a unitary member made of a resilient material. That is, the shock absorber 100 may be formed as a unitary member made of rubber, plastic, foam rubber, or other suitable material. The shock absorber 100 may use a uniform material. That is, the shock absorber 100 may use only one type of material with no additional features or structures of another material are used. Thus, the manufacturing process for the buckling shock mounting may include a single step molding process in some embodiments. Other methods of manufacturing the shock absorber 100 may include any suitable process may be implemented to form the shock absorber 100, including a molding and/or machining process.

The shock absorber 100 is generally planar with a cellular internal structure. That is, within the shock absorber 100, a number of cells 102 are defined by inter-joined panels 104. The panels 104 are arranged within the plane of the shock absorber 100. Generally, each panel 104 is itself planar and oriented perpendicular within the plane defined by the shock absorber 100. Thus, the panels 104 provide vertical sidewalls within the shock absorber 100 that define the cells 102.

As illustrated, both the shock absorber 100 and the cells 102 may be rectangular in shape (e.g., square). In other embodiments, the cells 102 may take any suitable geometric shape. For example, the cells 102 may be triangles, pentagons, hexagons, heptagons, octagons and so forth. Additionally, it should be appreciated that the shock absorber 100 may take and suitable geometric shape. In some embodiments, the cells may take the form of more than one geometric shape. That is, the cells 102 may be both triangular and rectangular, for example. Further, in some embodiments, the shape of the shock absorber 100 may not have the same shape as the cells 102. That is, the shock absorber 100 may have a rectangular shape and while the cells are a triangular shape.

Figure 2:
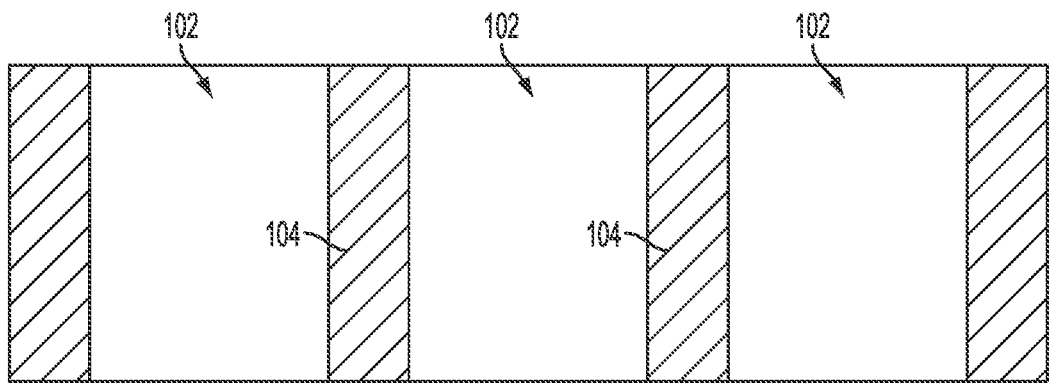
FIG. 2 is a cross sectional view of the buckling shock absorber of FIG. 1 taken along line II-II.

FIG. 2 is a cross-sectional view of the panels 104 taken along line II-II in FIG. 1. As may be seen, the panels 104 are substantially vertical and provide vertical sidewalls to the cells 102. Depending on the shape of the cells 102, the panels 104 may be substantially parallel, as shown or may be angled relative to each other.

Figure 3:
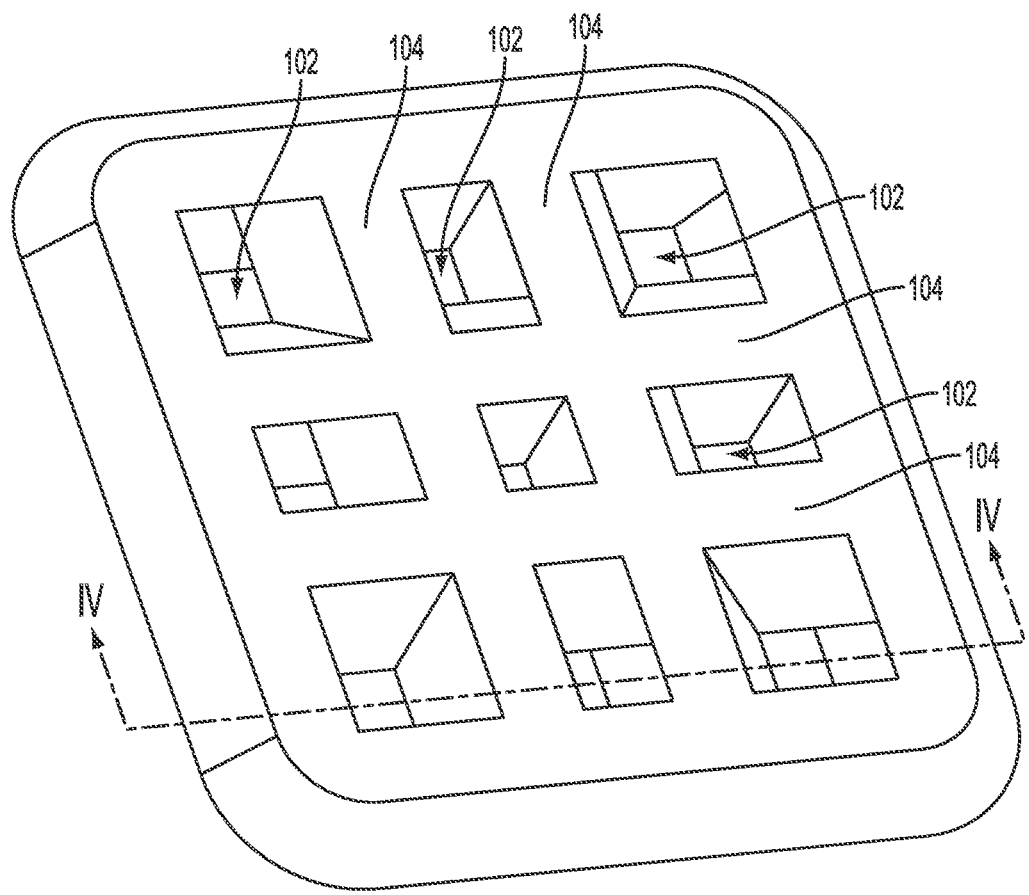
FIG. 3 illustrates the buckling shock absorber of FIG. 1 after a force exceeding a buckling threshold is applied.
Figure 4:
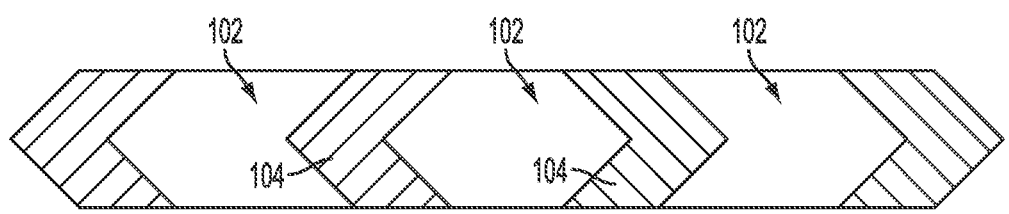
FIG. 4 is a cross sectional view of the buckling shock absorber of FIG. 3 taken along line IV-IV.

FIG. 3 illustrates the shock absorber 100 when force is applied causing the panels 104 to buckle. FIG. 4 is a cross-sectional view of the panels 104 taken along line IV-IV in FIG. 3. Generally, the direction in which the panels 104 buckle does not impact the functionality of the shock absorber 100. In some cases, the direction of buckling may be by design, while in other embodiments, the direction of buckling may occur at random. As such, some panels may buckle inwardly and other outwardly. In some embodiments, all panels 104 may buckle in the same direction. As shown, the panels 104 may all buckle outwardly from a center of the shock absorber 100.

It should be appreciated that in addition to buckling, the panels 104 may compress to absorb force. In particular, the points of intersection 106 for the panels are compressed when the panels 104 buckle. Further, the panels themselves may compress after buckling, depending upon the amount of force applied. Due to the resilient nature of the material of which the shock absorber 100 is made, the compression and buckling is temporary once the force is removed and the shock absorber 100 and its panels 104 return to their original shape and return a component to its intended position.

Figure 5:
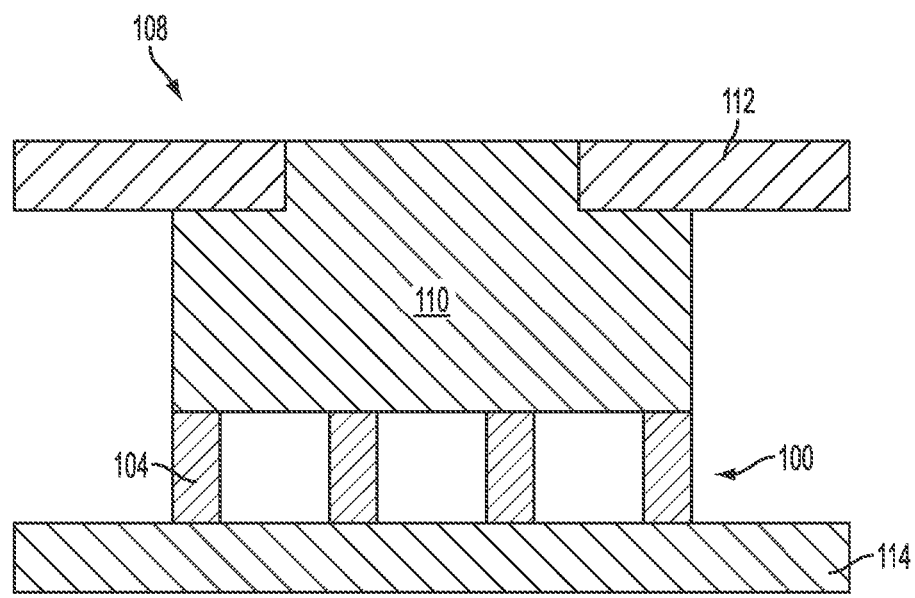
FIG. 5 illustrates a component mounted on a buckling shock absorber within a housing of an electronic device.

FIG. 5 illustrates a partial cross-sectional view of a device 108 with a component 110 mounted within its housing 112. The component 110 may take any form, but more particularly may be one that is sensitive to shock. For example, the component 110 may take the form of a camera, a display, a hard disk drive, a speaker, a microphone, a printed circuit board, or other such component. In FIG. 5, the component 110 may be a camera.

The shock absorber 100 supports the component 110 within the housing 112. That is, the shock absorber 100 is located between the component 110 and a support structure 114 within the housing 112. The support structure 114 may be a structure to which the component is typically mounted. In some embodiments, the support structure 114 may be part of the housing 112. In other embodiments, the support structure 114 may be mechanically coupled to the housing 112 and the component 110 may not be directly coupled to the housing 112. In some cases, the component 110 or a portion of the component may abut or be proximately located to the housing 112.

The mounting of the component 110 to the support structure 114 may serve a dual purpose. First it may provide rigid support of the component so that it may be held in a desired position within the housing 112. In particular, because of the cellular structure of the shock absorber 100 it is able to provide rigid support up to a certain level of force before absorbing the force through bucking and compressing. As such, the shock absorber 100 may generally hold the component rigidly in position.

Second, the shock absorber 100 helps to prevent the component from being exposed to an excessive force that may present an issue for the component. To achieve this, the shock absorber 100 may absorb any force that is above a threshold level though buckling and compression. The threshold level may be determined based on the particular sensitivity of the component to mechanical shock. For example, a camera maybe more sensitive to mechanical shock than a microphone. As such, the threshold level of force that causes a shock absorber to buckle may be lower for supporting a camera than a shock absorber that is to support a microphone. Customizing the threshold level for buckling of the shock absorber is discussed in greater detail below.

Figure 6A:
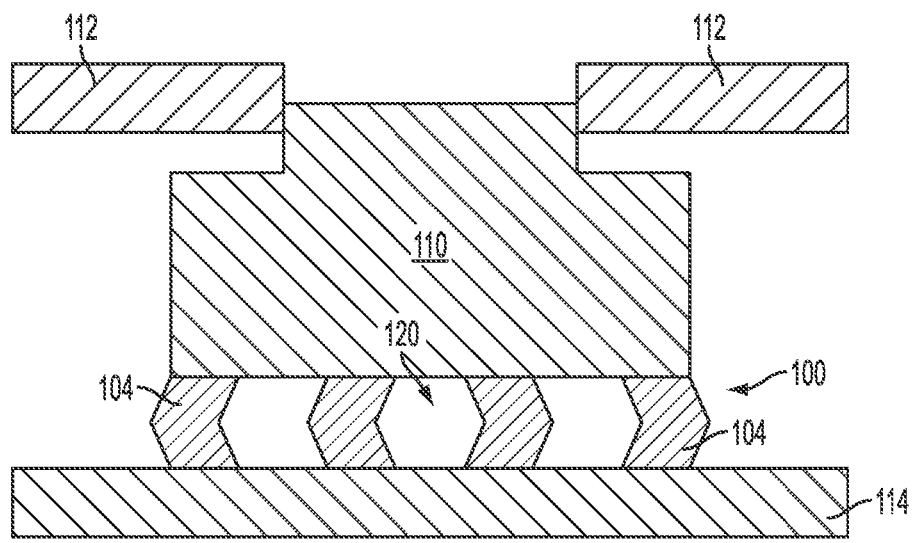
FIG. 6A illustrates the component of FIG. 5 displaced within the housing of the electronic device after a force exceeding a buckling threshold caused the buckling shock absorber to buckle.

Referring to FIG. 6A, displacement of the component 110 within the housing 112 is illustrated when a force 120 causes the panels 104 of the shock absorber 100 to buckle. The force 120 may be caused by impact of the device 108 after a fall, for example. The buckling of the panels 104 absorbs the force, substantially lessening the impact of the force 120 on the component 110. With the buckling of the panels 104, the component 110 may move relative to both the housing 112 and the support structure 114. In particular, the component 110 may be brought closer to the support structure 114 and may be separated from the housing 112.

Figure 6B:
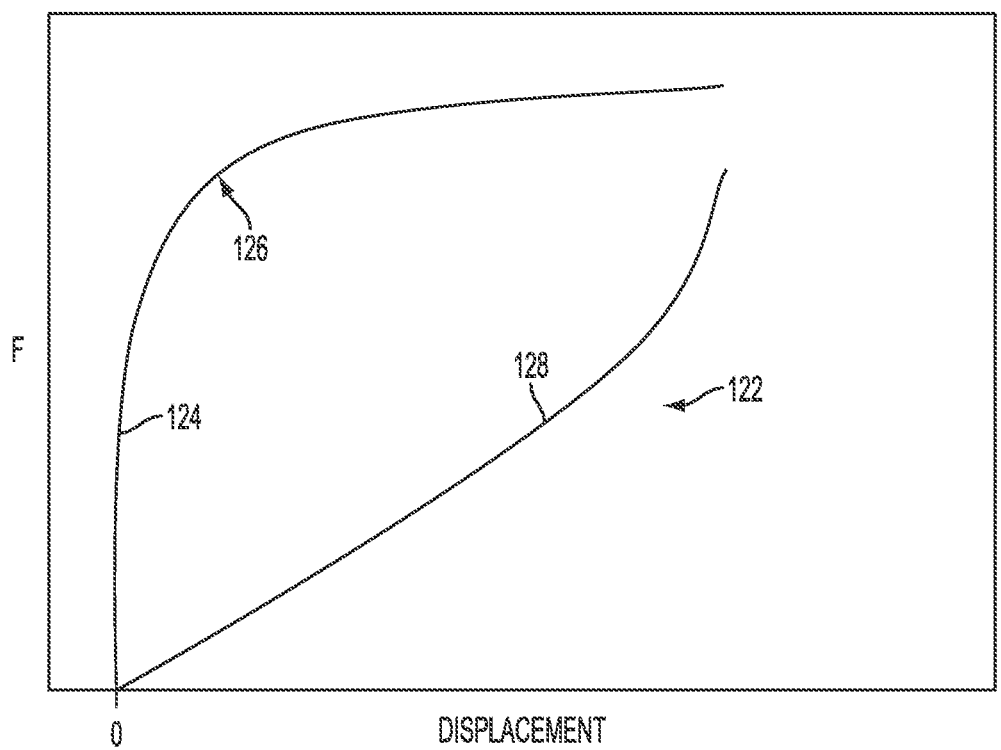
FIG. 6B is a plot illustrating for comparing force to displacement profiles of the buckling shock absorber and a conventional absorber.

FIG. 6B is a plot 122 comparing the displacement profile of a conventional foam or rubber absorber with that of the present buckling shock mounting 100. The vertical axis may represent the amount of force applied to the shock absorbers and the horizontal axis represents the displacement. As the plot is merely illustrative in nature, no units or scale is provided. Rather, the plot is to show the relative displacement characteristics for comparison. It should be appreciated, therefore, that in an actual implementation, the curves may take a different shape and the relationship between the curves may be different.

In FIG. 6B, a curve line 124 represents the displacement profile for the buckling shock mounting 100 discussed herein. As may be seen, the buckling shock mounting remains rigid (e.g., it substantially does not displace) until a threshold amount of force is applied at approximately the area indicated by the arrow 126. This indicates when the panels buckle to absorb the force. In contrast, the curve 128 illustrates a conventional absorber that may have a nearly linear displacement when any force is applied. As such, the conventional absorber would be inadequate to support a component in place within a housing.

Figure 7A:
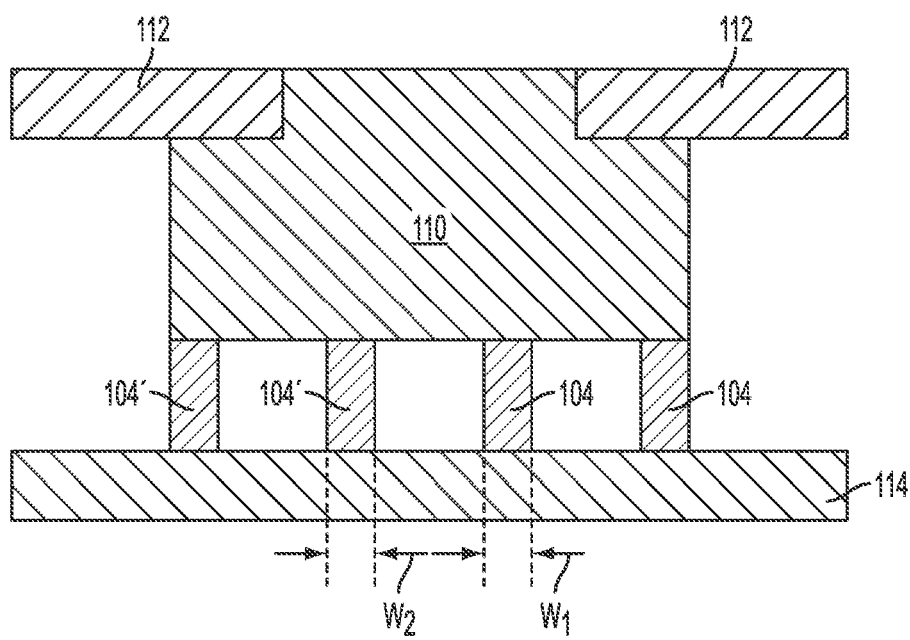
FIG. 7A illustrates a component mounted on a buckling shock absorber having panels of varying thickness.

In some cases, the size of one or more panels 104 may be changed to customize the shock absorbing response of the panels (e.g. to customize the threshold at which the panels buckle). For example, FIG. 7A illustrates two panels 104' that have an increased thickness so that a threshold force that causes the panels to buckle is greater than that of the other panels 104. Specifically, $W_2$ is greater than $W_1$, thus providing greater rigidity in 104' than 104. In other embodiments, the thickness of one or more panels may be decreased so that the amount of force that causes buckling of the panels may be less than other panels. As such, the rigidity and force threshold for one or more panels may be customized based on its thickness.

Figure 7B:
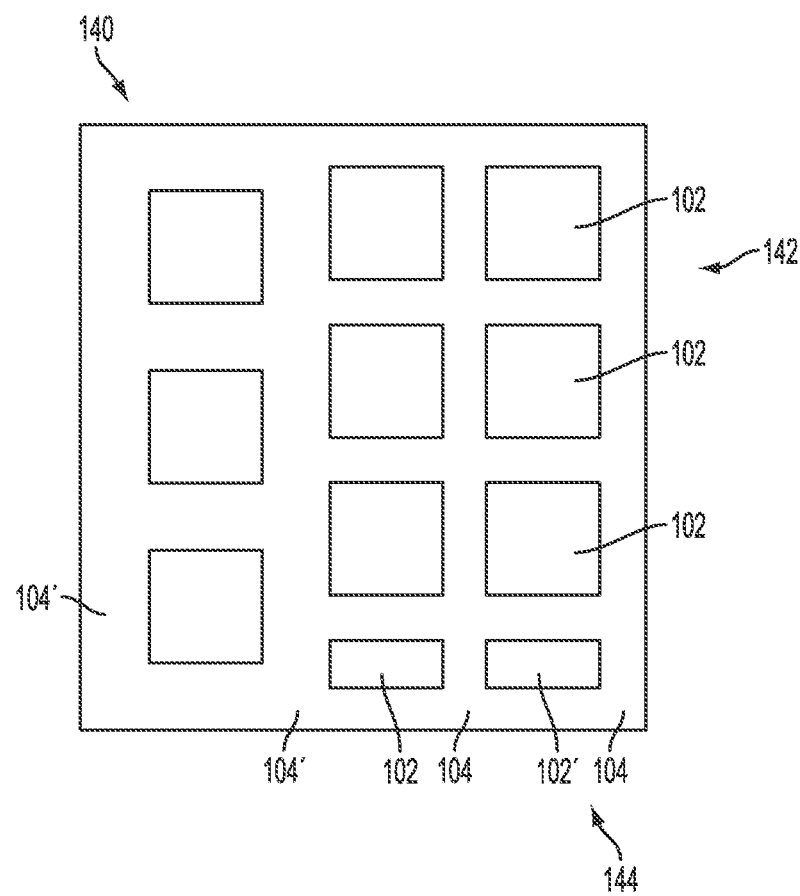
FIG. 7B is a top view of a buckling shock absorber having panels of varying thickness and cells of varying size and shape.
Figure 7C:
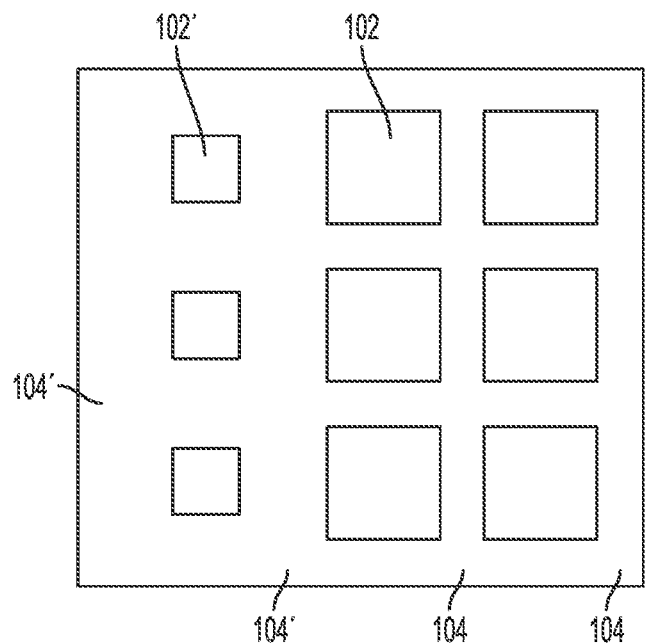
FIG. 7C is a top view of a buckling shock absorber having panels of varying thickness and cells of varying size.

It should be appreciated a single shock mounting may have one or more zones having customized force thresholds. That is, there may be multiple regions of a single shock mounting that have either thicker or thinner panels relative to other panels to provide buckling at a different threshold from other regions. FIG. 7B illustrates the example where panels 104' are thicker than panels 104 creating a first region 140 having a first threshold for buckling and a second region 142 having a different buckling threshold. Further, a third region 144 may be created based on changing the shape and/or density of the cells 102 of the shock mounting. Specifically, as the size of the cells is decreased, there is effectively more panels resulting in a higher threshold for buckling for a particular region of the shock mounting. The distribution of cells 102 may be altered by changing the thickness of the panels 104'. In other embodiments, the size of the cells 102 may be altered to accommodate the thicker or thinner panels, as shown in FIG. 7C with cells 102'.

The creation of regions having different rigidity and buckling thresholds may be useful in a variety of different cases. For example, it may be useful when a particular component has unevenly distributed weight. Thicker panels may be provided to support the heavier portions of the component. Further, a single shock absorber may be utilized to support and provide mechanical shock protection to components that may have different mechanical shock sensitivities. Returning to the camera and microphone example, a single shock absorber having regions with different rigidity and buckling thresholds may be used to support both components.

Figure 8:
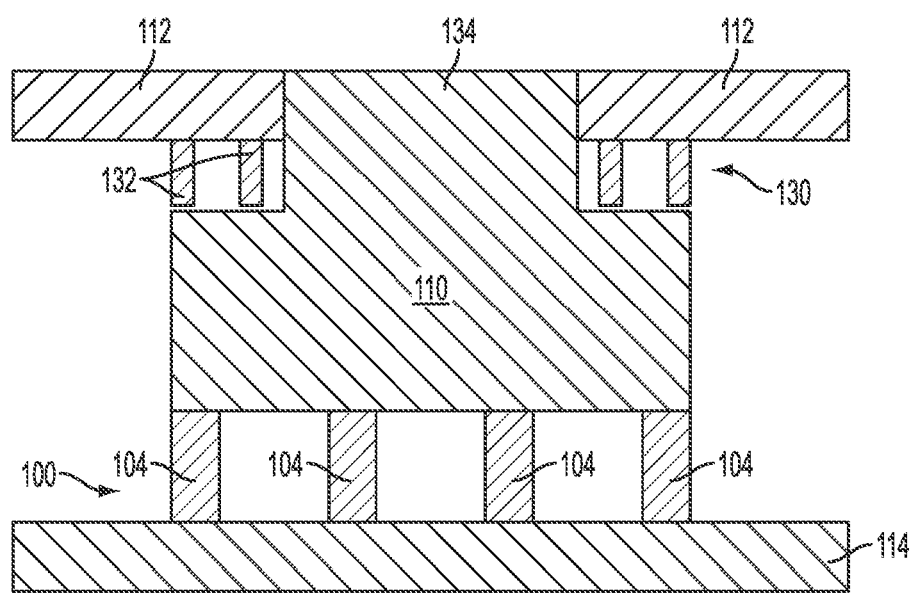
FIG. 8 illustrates a component mounted on a buckling shock absorber within a housing of an electronic device having a second buckling shock absorber mounted to the housing.

In some embodiments, more than one shock absorber may be utilized to provide shock absorption in multiple directions. Additionally, the shock absorbers may provide alignment assistance to components where alignment may be important. For example, in FIG. 8 a second shock absorber 130 is provided on the opposite side of the component from the shock absorber 100. As illustrated, the second shock absorber 130 may generally have smaller panels 132 (e.g., shorter and thinner) than the panels of the shock absorber 100. However, the second shock absorber may function in a similar manner to the shock absorber 100. In particular, the shock absorber 130 may provide rigid support to the component 110 up to a threshold level of force before buckling to absorb the force. Further, the second shock absorber 130 is resilient so that it returns to a resting state once the force is removed.

As illustrated, a portion 134 of the component 110 may extend at least partially though the housing 112 of the device 108. In the event that a force is applied that causes the component 110 to deflect in one direction (e.g., to the right) after the first shock absorber has buckled and compressed, it is possible that the portion 134 of the component may become stuck behind the housing 112 and out of place to properly function. Accordingly, the second shock absorber 130 may be configured to help align the component 110 within the housing 112. That is panels 132 may help urge the component 110 into proper alignment. In some embodiments, one or more panels of the second shock absorber 130 may be located adjacent to and even in contact with the portion 134 of the component 110 to help maintain proper alignment of the component.

Figure 9:
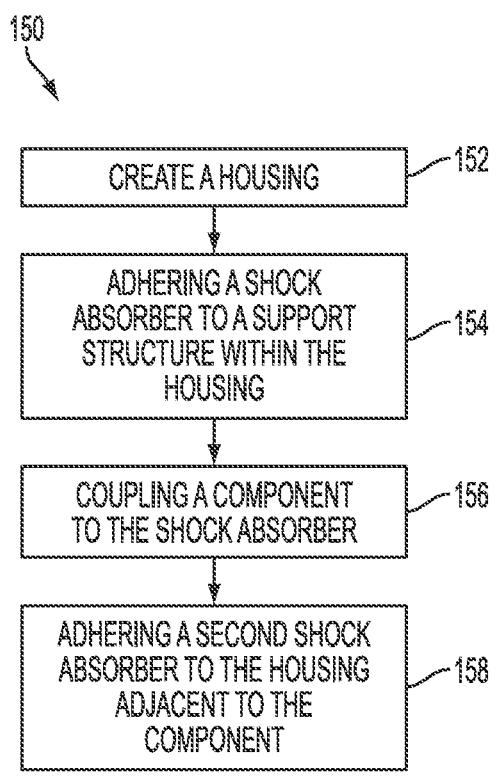
FIG. 9 illustrates a method of manufacturing an electronic device having a buckling shock absorber.

FIG. 9 illustrates a method 150 of manufacturing an electronic device having shock absorbers in accordance with an example embodiment. Initially, a housing for the device is created (Block 152). The housing may be manufactured in accordance with any suitable process such as, but not limited to: a molding process, a machining process, and/or an assembly process. A shock absorber is adhered to a support structure within the housing (Block 154) and a component is coupled to the shock absorber (Block 156). A second shock absorber may be coupled the housing adjacent to the component (Block 158).

The foregoing describes some example embodiments of shock absorbers and methods of manufacturing devices having shock absorbers that provide rigid support for components as well as protection against mechanical shock. Although the foregoing discussion has presented specific embodiments, persons skilled in the art will recognize that changes may be made in form and detail without departing from the spirit and scope of the embodiments. For example, the shock absorber may include structures that prevent buckling in a certain direction and or relief cuts in panels to help encourage buckling of the panels in a desired direction.

The invention claimed is:

1. A buckling shock mounting comprising:
a plurality of panels oriented transverse to a plane;
wherein the plurality of panels are made of a uniform material;
wherein each of the panels is configured to buckle without breaking when a threshold amount of force is applied perpendicularly to the plane, and wherein each of the panels is configured to deflect in accordance with a first force-to-displacement ratio for a first applied force that is less than the threshold amount, and deflect in accordance with a second force-to-displacement ratio for a second applied force that is greater than the threshold amount, and
wherein the first force-to-displacement ratio is greater than the second force-to-displacement ratio.

2. The buckling shock mounting of claim 1 further comprising a plurality of geometric shapes formed within the plane by the plurality of panels.

3. The buckling shock mounting of claim 2, wherein a first geometric shape buckles at a first threshold amount of force and a second geometric shape buckles at a second threshold amount of force.

4. The buckling shock mounting of claim 1, wherein a thickness of at least one panel is increased to increase the threshold amount of force that causes the panels to buckle.

5. The buckling shock mounting of claim 1, wherein a thickness of a group of panels is increased to increase the threshold amount of force that causes the panels to buckle.

6. The buckling shock mounting of claim 1, comprising a first region having a first buckling threshold and a second region having a different buckling threshold.

7. The buckling shock mounting of claim 1, wherein the at least one geometric shape comprises at least one of a rectangle, a triangle, a heptagon, or a hexagon.

8. An electronic device comprising:
a housing;
a shock sensitive component mounted within the housing;
a buckling shock mounting made of a uniform material and supporting the component, wherein
the buckling shock mounting comprises a plurality of geometric cells having sidewalls configured to buckle without breaking upon application of a threshold amount of force applied in a first direction;
wherein at least one sidewall is configured to deflect in accordance with a first force-to-displacement ratio for a first applied force that is less than the threshold amount, and deflect in accordance with a second force-to-displacement ratio for a second applied force that is greater than the threshold amount, and
wherein the first force-to-displacement ratio is greater than the second force-to-displacement ratio.

9. The electronic device of claim 8, wherein the buckling shock mounting comprises a rubber or foam material.

10. The electronic device of claim 8, wherein the buckling shock mounting comprises:
- a first region configured to buckle upon application of a first amount of force; and
- a second region configured to buckle upon application of second amount of force, wherein the second amount of force is less than the first amount of force.

11. The electronic device of claim 10, wherein the sidewalls of the first region are thicker than the sidewalls of the second region.

12. The electronic device of claim 10, wherein at least one of the cells takes the shape of a rectangle, a triangle, a heptagon, and a hexagon.

13. The electronic device of claim 10, wherein the cells of the first region and the second region have different geometric shapes.

14. The electronic device of claim 8, wherein the shock sensitive component comprises one of a: camera, a display, a speaker, a microphone, a printed circuit board, or a hard disk drive.

15. The electronic device of claim 8 further comprising a second buckling shock mounting coupled between the housing and the shock sensitive component.

16. The electronic device of claim 15, wherein the second buckling shock mounting is configured to help maintain alignment of the shock sensitive component within the housing.

17. The electronic device of claim 15, wherein the second buckling shock mounting comprises:
- a first region configured to buckle upon application of a first amount of force; and
- a second region configured to buckle upon application of second amount of force, wherein the second amount of force is less than the first amount of force.

18. A method of manufacturing an electronic device comprising a shock sensitive component, the method comprising:
- creating a housing;
- positioning a component within the housing;
- coupling a buckling shock mounting to the component on a side of the component opposite of the housing, the buckling shock mounting comprising a plurality of panels arranged within a plane to form a geometric shape,
  - wherein the plurality of panels are configured to buckle without breaking when a threshold amount of force is applied to the panels, the panels buckling in a direction other than a direction in which the force is applied, the panels are configured to deflect in accordance with a first force-to-displacement ratio for a first applied force that is less than the threshold amount, and deflect in accordance with a second force-to-displacement ratio for a second applied force that is greater than the threshold amount, and
  - wherein the first force-to-displacement ratio is greater than the second force-to-displacement ratio.

19. The method of manufacturing of claim 18 further comprising coupling a second buckling shock mounting between the housing and the component.

20. The method of manufacturing of claim 18, wherein the second buckling shock mounting is configured to buckle at a force approximately equal to that of the panels of the buckling shock mounting.

* * * * *